United States Patent
Thomsen et al.

(10) Patent No.: US 9,625,127 B2
(45) Date of Patent: Apr. 18, 2017

(54) RUGGED LIGHTING SYSTEM

(71) Applicant: IndustraLight LLC, Nibley, UT (US)

(72) Inventors: J. Ryan Thomsen, Nibley, UT (US);
Seth M. Marks, Vail, AZ (US); Mark Williams, Tooele, UT (US); Jim Shumway, Saratoga Springs, UT (US); Christopher Woolington, Elko, NV (US)

(73) Assignee: Industralight, LLC, Nibley, UT (US)

( * ) Notice: Subject to any disclaimer, the term of this patent is extended or adjusted under 35 U.S.C. 154(b) by 0 days.

(21) Appl. No.: 14/726,528

(22) Filed: May 30, 2015

(65) Prior Publication Data

US 2015/0362155 A1 Dec. 17, 2015

Related U.S. Application Data

(60) Provisional application No. 62/006,076, filed on May 31, 2014.

(51) Int. Cl.
| | |
|---|---|
| *F21S 8/00* | (2006.01) |
| *F21V 15/01* | (2006.01) |
| *F21V 5/04* | (2006.01) |
| *F21V 5/00* | (2015.01) |
| *F21V 17/12* | (2006.01) |
| *F21V 17/00* | (2006.01) |
| *F21V 31/00* | (2006.01) |

(Continued)

(52) U.S. Cl.
CPC .............. *F21V 15/01* (2013.01); *F21V 5/008* (2013.01); *F21V 5/048* (2013.01); *F21V 17/002* (2013.01); *F21V 17/12* (2013.01); *F21V 23/0464* (2013.01); *F21V 25/10* (2013.01); *F21V 31/005* (2013.01); *F21Y 2101/00* (2013.01)

(58) Field of Classification Search
CPC .......... F21V 15/01; F21V 5/008; F21V 5/048; F21V 17/02; F21V 17/12; F21V 23/0464; F21V 25/10; F21V 31/005
USPC ......................................... 362/268, 434, 375
See application file for complete search history.

(56) References Cited

U.S. PATENT DOCUMENTS

| | | | | |
|---|---|---|---|---|
| 4,725,929 A | * | 2/1988 | Huang | B60Q 1/20 362/268 |
| 6,902,287 B2 | * | 6/2005 | Taylor | G08B 5/36 362/264 |

(Continued)

*Primary Examiner* — Bryon T Gyllstrom
(74) *Attorney, Agent, or Firm* — Preston P. Frischknecht; Project CIP

(57) ABSTRACT

A new and innovative, rugged lighting system is provided. The problem of achieving a lighting system that optimizes ruggedness, luminosity, energy and thermal efficiency, versatility, and unbundling of key components is solved. Embodiments of the present invention include a rugged lighting system comprising a housing unit with a body with integrally formed back, sides, and a front with an opening to provide access to the interior of the housing unit; a first lens configured to substantially cover the opening; a first lens bezel configured to removeably attach to the housing unit over the first lens; a second lens configured for placement over the first lens; and a second lens bezel configured to removeably attach to the housing unit over the first lens bezel. Various embodiments further include a light module within the housing unit with a light emitting diode (LED) mounted to an electronics module having a printed circuit board for operating the LED.

7 Claims, 11 Drawing Sheets

(51) Int. Cl.
  *F21V 25/10*  (2006.01)
  *F21V 23/04*  (2006.01)
  *F21Y 101/00*  (2016.01)

(56) References Cited

U.S. PATENT DOCUMENTS

| | | | | |
|---|---|---|---|---|
| 7,708,452 | B2* | 5/2010 | Maxik | F21V 29/20 |
| | | | | 174/254 |
| 7,874,709 | B1* | 1/2011 | Beadle | F21S 8/022 |
| | | | | 362/285 |
| 8,837,928 | B1* | 9/2014 | Clearman | E05B 17/2019 |
| | | | | 206/316.2 |
| 9,030,606 | B2* | 5/2015 | Campbell | G03B 17/18 |
| | | | | 348/370 |
| 2007/0285926 | A1* | 12/2007 | Maxik | F21V 29/006 |
| | | | | 362/294 |
| 2008/0089060 | A1* | 4/2008 | Kondo | F21V 17/107 |
| | | | | 362/231 |
| 2009/0268439 | A1* | 10/2009 | Chen | H01L 31/0547 |
| | | | | 362/183 |
| 2010/0020541 | A1* | 1/2010 | Incorvia | F21V 31/04 |
| | | | | 362/249.01 |
| 2012/0120639 | A1* | 5/2012 | Armer | F21V 31/005 |
| | | | | 362/158 |
| 2012/0206901 | A1* | 8/2012 | Kim | F21K 9/00 |
| | | | | 362/84 |
| 2013/0265755 | A1* | 10/2013 | Adams | F21V 5/04 |
| | | | | 362/235 |

* cited by examiner

RUGGED LIGHTING SYSTEM

CROSS-REFERENCE TO RELATED APPLICATIONS

This application claims priority to U.S. Provisional Application No. 62/006,076, filed on May 31, 2014.

BACKGROUND OF THE INVENTION

Many industries require vehicles to operate continually, day and night, in harsh conditions. The mining industry is one such example. Operators are often required to work in dark and/or nighttime conditions on heavy vehicles. Lighting in these circumstances is paramount. Today, traditional lighting technology is being surpassed by LED lighting because of the latter's energy and thermal efficiency, not to mention increased brightness. Despite the adoption of this technology, a number of technological deficiencies exist in current LED lighting products for mining and large industrial applications. For example, many products are not sufficiently constructed to withstand the extreme and varied environments encountered. Thus, LED lighting systems and their internal electronic componentry are susceptible to impact and moisture, among other environmental hazards. Also, the componentry of many LED lighting products is not unbundled, and often, damage to one element requires replacement of the entire unit at high cost. Additionally, current LED lighting products do not allow for customization and versatility in beam features and control or power usage and regulation. In any event, there is great need for innovation to achieve a lighting system that optimizes ruggedness, luminosity, energy and thermal efficiency, versatility, and unbundling of key components.

SUMMARY OF THE INVENTION

In accordance with the above, a new and innovative, rugged lighting system is provided. The problem of achieving a lighting system that optimizes ruggedness, luminosity, energy and thermal efficiency, versatility, and unbundling of key components is solved. Embodiments of the present invention include a rugged lighting system comprising a housing unit with a body with integrally formed back, sides, and a front with an opening to provide access to the interior of the housing unit; a first lens configured to substantially cover the opening; a first lens bezel configured to removeably attach to the housing unit over the first lens; a second lens configured for placement over the first lens; and a second lens bezel configured to removeably attach to the housing unit over the first lens bezel. Various embodiments further include a light module within the housing unit with a light emitting diode (LED) mounted to an electronics module having a printed circuit board for operating the LED.

These and other aspects of the present invention will become more fully apparent from the following description and appended claims, or may be learned by the practice of the invention as set forth hereinafter.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

Figure 1:
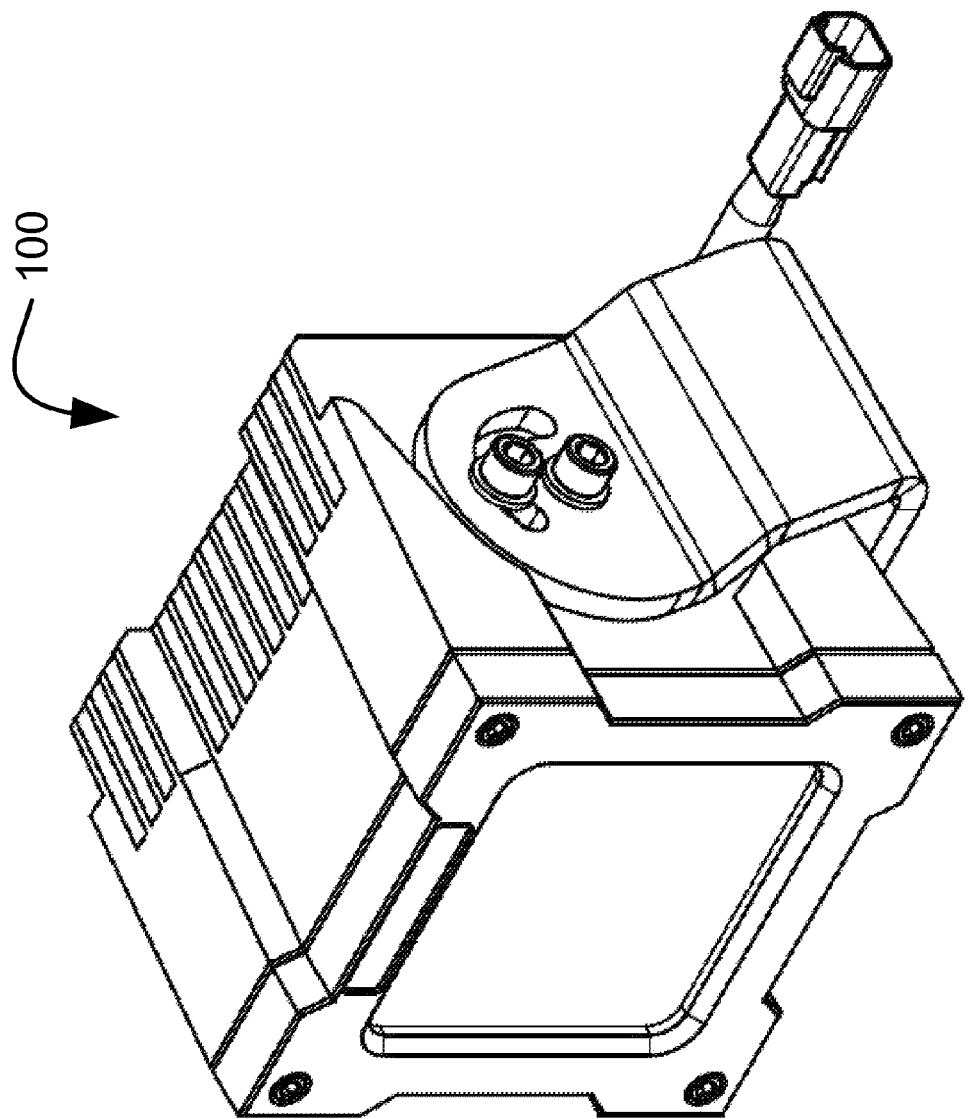
FIG. 1 is an isometric view of a rugged lighting system.

The present invention in its various embodiments, some of which are depicted in the figures herein, is a rugged lighting system. FIG. 1 depicts the outside of one embodiment of a fully assembled, rugged lighting system 100.

Figure 2:
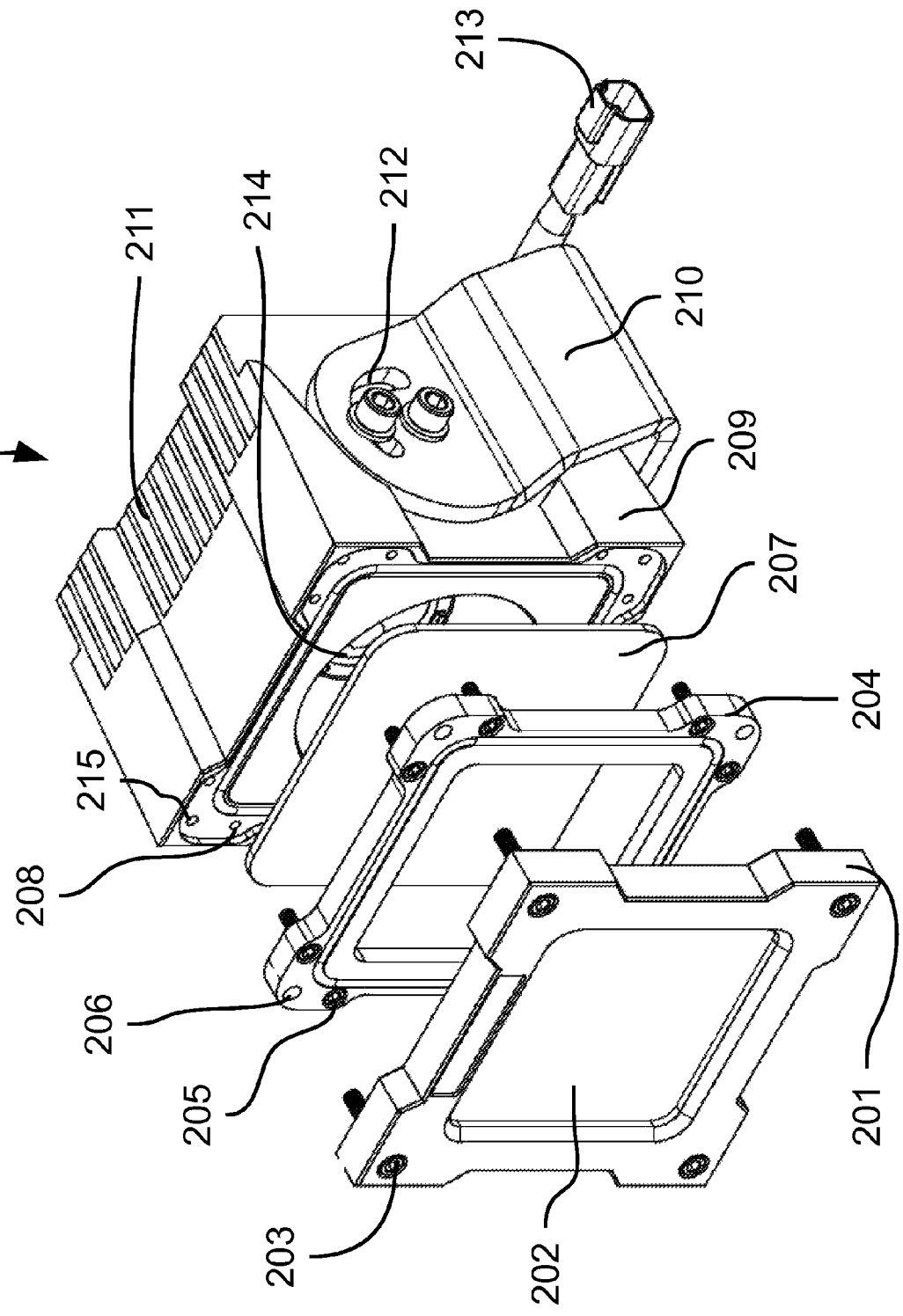
FIG. 2 is an isometric, exploded view of a rugged lighting system.

Referring now to FIG. 2, an exploded perspective view of a rugged lighting system 100 with various components is shown. In preferred embodiments, the system 100 is comprised of a first lens 207, second lens 202, and housing unit 209 with LED array 214.

The first lens 207 is removeably attachable to the front of the housing unit 209. In certain embodiments, the means for removable attachment of the first lens 207 is a first lens bezel 204 configured to overlap a portion of the perimeter of the first lens 207. Depending on the embodiment, the first lens bezel 204 may be either permanently affixed to or separable from the first lens 207. In the illustrated embodiment, this first lens bezel 204 is separable and shaped as a key to precisely fit the housing unit 209. In various embodiments, the first lens bezel 204 may incorporate grommets, seals, or o-rings to optimize sealing against the moisture and elements that may be found in outdoor environments. Thus, the first lens 207 and first lens bezel 204 are configured to seal an LED array 214 and corresponding electronics.

The first lens bezel 204 may have one or more first apertures 205 for directly receiving bolts, such that the bolt heads rest within the first lens bezel 204 when placed therein, thereby facilitating removeable attachment of the first lens bezel 204 and the first lens 207 to the housing unit 209. In the illustrated embodiment, the first lens bezel 204 has two such apertures in each of its four corners. The first lens bezel 204 may also have one or more second apertures 206 for indirectly receiving bolts, such that the bolt head does not rest within the first lens bezel 204, thereby facilitating removable attachment of other components (e.g., 201, 202), first to the first lens bezel 204, first lens 207 and then, second, to the housing unit 209. In the illustrated embodiment, the first lens bezel 204 has one such aperture in each of its four corners.

The second lens 202 is also removeably attachable to the housing unit 209. The second lens 202 is configured for placement over the first lens 207 when the system 100 is assembled. The means for removable attachment of the second lens 202 is a second lens bezel 201 configured to overlap the perimeter of the second lens 202. Again, depending on the embodiment, the second lens bezel 201 may be either permanently affixed to or separable from the second lens 202. In the illustrated embodiment, the second lens bezel 201 is shaped as a key to precisely fit over the first lens bezel 204. In various embodiments, the second lens bezel 201 may incorporate grommets, seals, or o-rings to further optimize sealing against moisture and elements.

The second lens bezel 201 may have one or more first apertures 203 for directly receiving bolts, such that the bolt heads rest within the second lens bezel 201 when placed therein. In the illustrated embodiment the position of these apertures 203 correspond to the position of the first lens bezel second apertures 206, such that bolts pass through the second lens bezel 201 and the first lens bezel 204, thereby facilitating removable attachment of the second lens 202 and second lens bezel 201 to the housing unit 209. In the illustrated embodiment, the housing unit 209 has one or more apertures 208, 215 into which bolts may be tightened to accomplish this. The second lens bezel 201 has one such aperture in each of its four corners in the illustrated embodiment.

Thus configured, the first lens 207 and first bezel 204 provide primary protection for the LED array 214 and internal electronics relating thereto. The second lens 202 and second bezel 201 provide a secondary and additional level of protection. Advantageously, if either lens is damaged, fogged, or otherwise requires maintenance or replacement, the unbundled nature of the lenses allows for such without having to replace other components. Moreover, in various embodiments, lenses may incorporate features resulting in numerous optical permutations depending on the desired function. For example, either first 207 and/or second 202 lenses may incorporate one or more of: (a) opaqueness or tinting to tone down brightness; (b) varying thickness or patterning for beam control or alteration; and (c) coloration to color the beam.

In various embodiments, the housing unit 209 is integrally formed of metal or other high strength material. The housing unit 209 may incorporate fins 211 on its top and/or back in order to dissipate heat generated by the LED array 214 and electronics. The housing unit 209 may also have a mounting unit 210 with a positioning feature 212 allowing for beam-adjustable mounting of the housing unit 209 on a vehicle or other surface.

The housing unit 209 also has an external power means 213. This external power means 213 may be wired in such away as to provide for hi power or low power settings depending on which or how connectors on the external power means 213 are connected with the connectors to the power supply. For example, external power means 213 may have multiple power connections such that power could be applied to a certain connection point (pin) causing the light to illuminate in its high power mode. Similarly, power could be applied to an alternate connection point in external power means 213 causing the light to illuminate in its low power mode.

Figure 3:
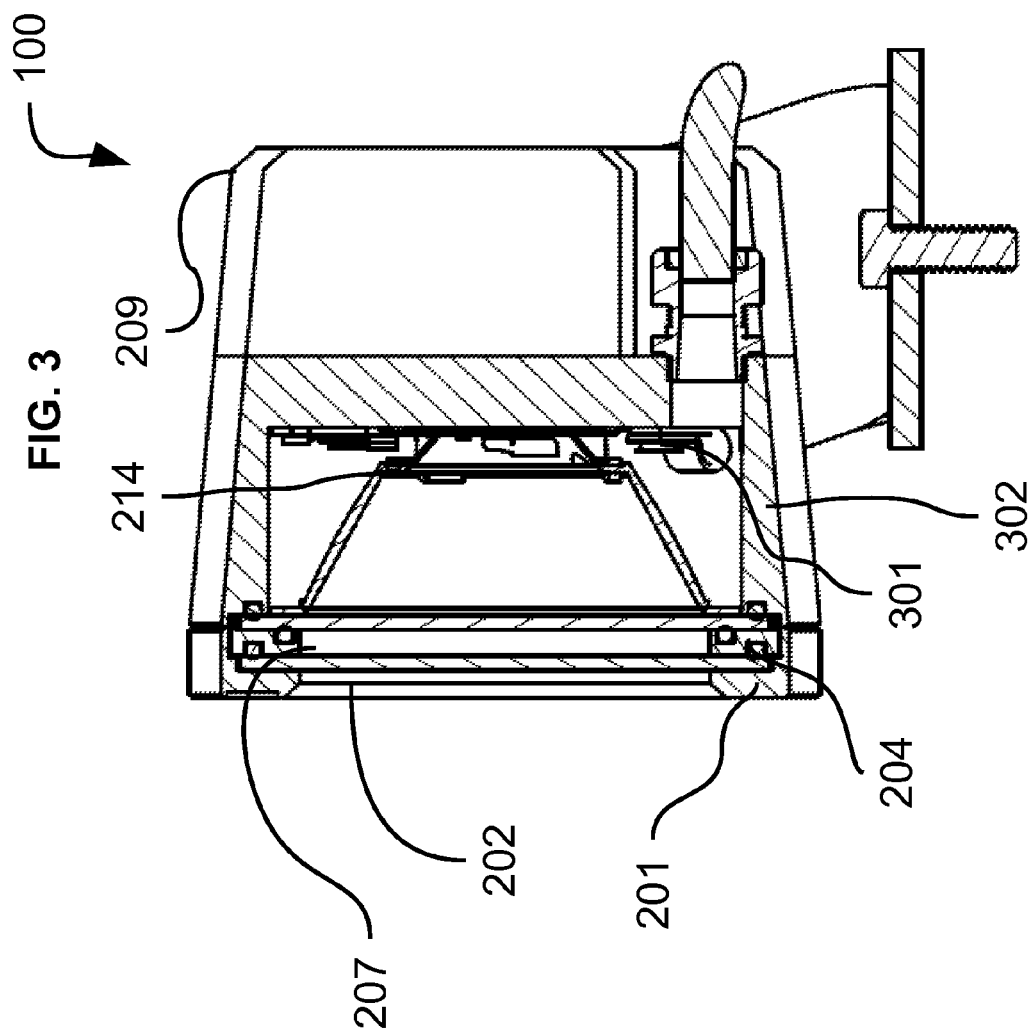
FIG. 3 is a side, cross-section of a rugged lighting system.
Figure 4:
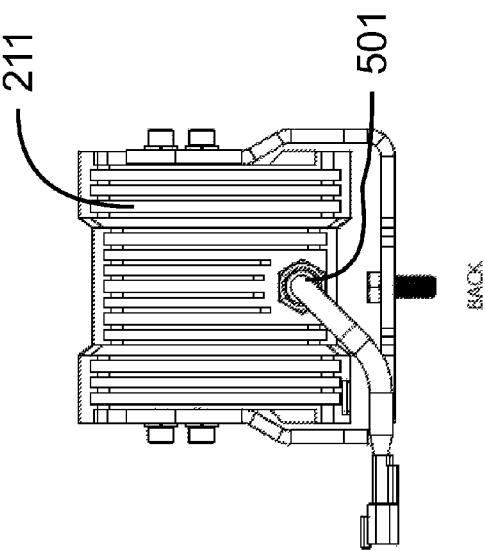
FIG. 4 is a front view of a rugged lighting system.
Figure 5:
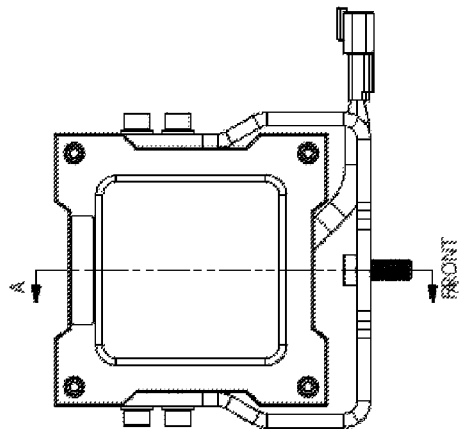
FIG. 5 is a back view of a rugged lighting system.
Figure 6:
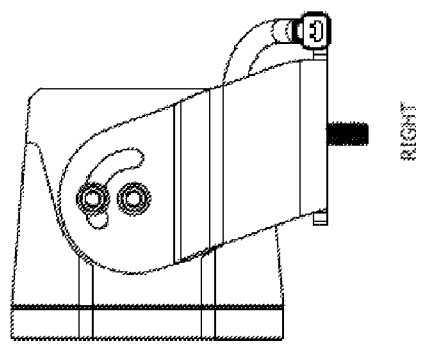
FIG. 6 is a left view of a rugged lighting system.
Figure 7:
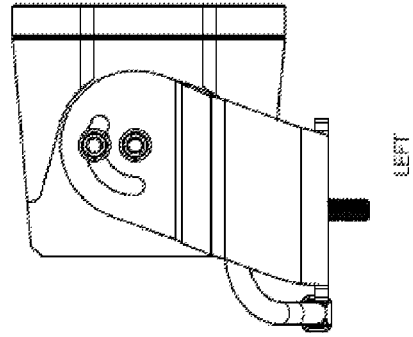
FIG. 7 is a right view of a rugged lighting system.
Figure 9:
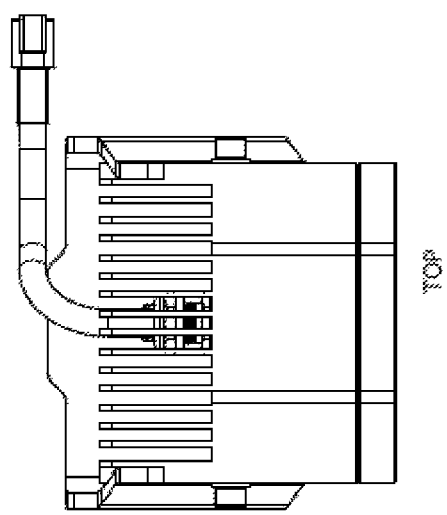
FIG. 9 is a bottom view of a rugged lighting system.
Figure 8:
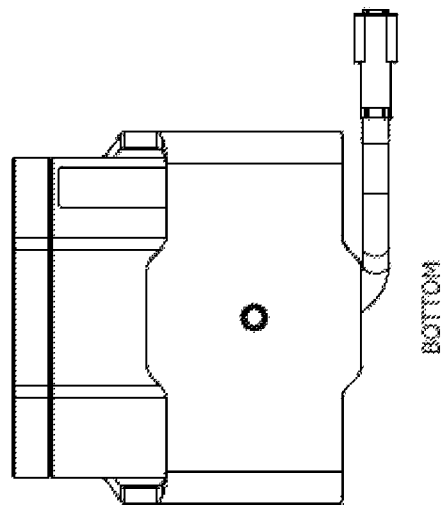
FIG. 8 is a top view of a rugged lighting system.
Figure 10:
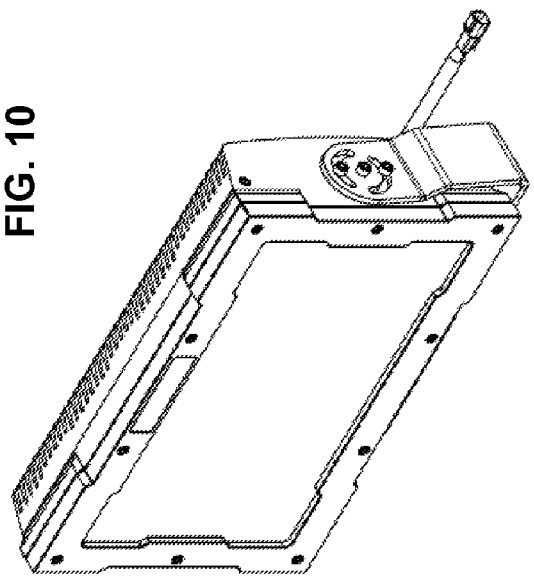
FIG. 10 is an isometric view of a rugged lighting system.
Figure 11:
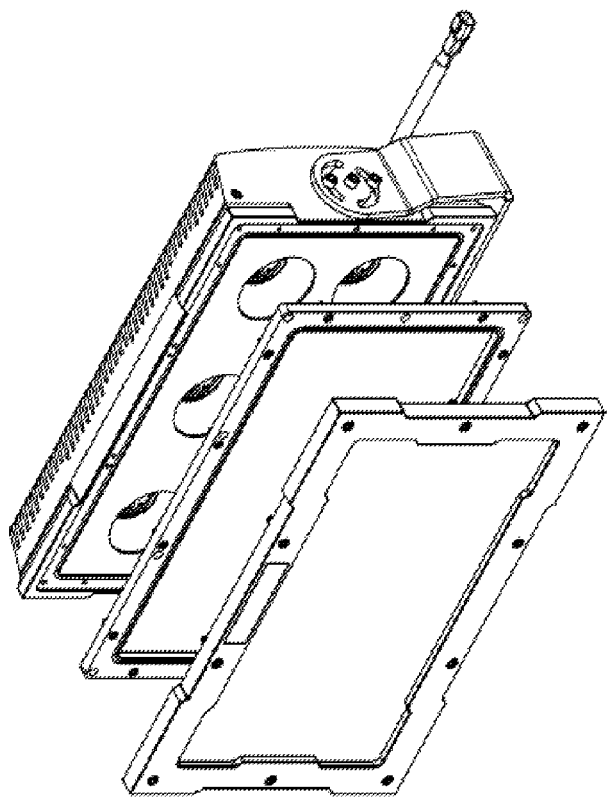
FIG. 11 is an isometric, exploded view of a rugged lighting system.
Figure 12:
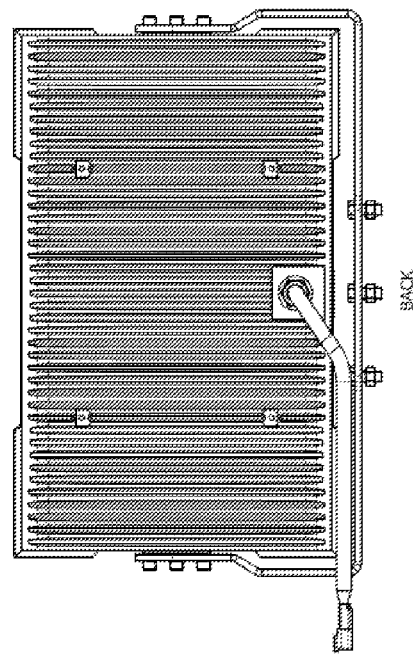
FIG. 12 is front view of a rugged lighting system.
Figure 14:
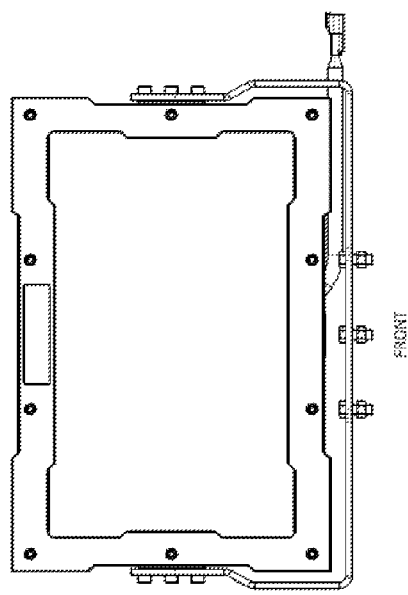
FIG. 14 is a left view of a rugged lighting system.
Figure 13:
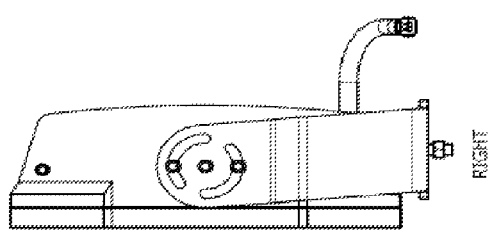
FIG. 13 is a back view of a rugged lighting system.
Figure 15:
FIG. 15 is a right view of a rugged lighting system.
Figure 16:
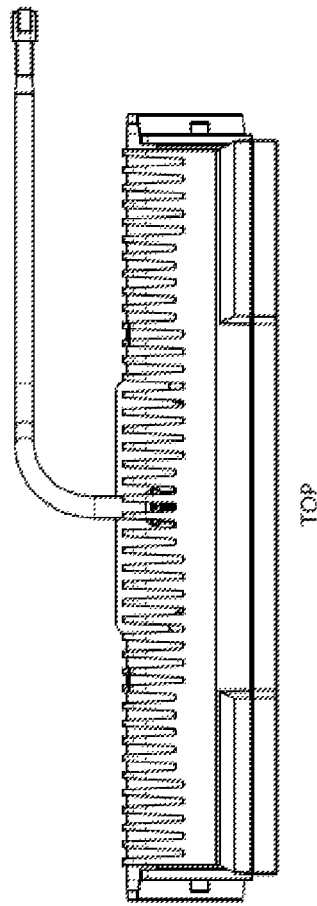
FIG. 16 is a top view of a rugged lighting system.
Figure 17:
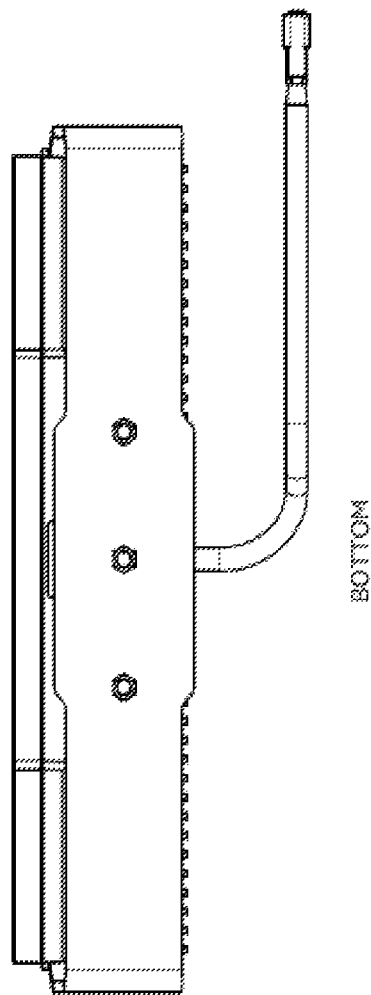
FIG. 17 is a bottom view of a rugged lighting system.
Figures 18, 19:
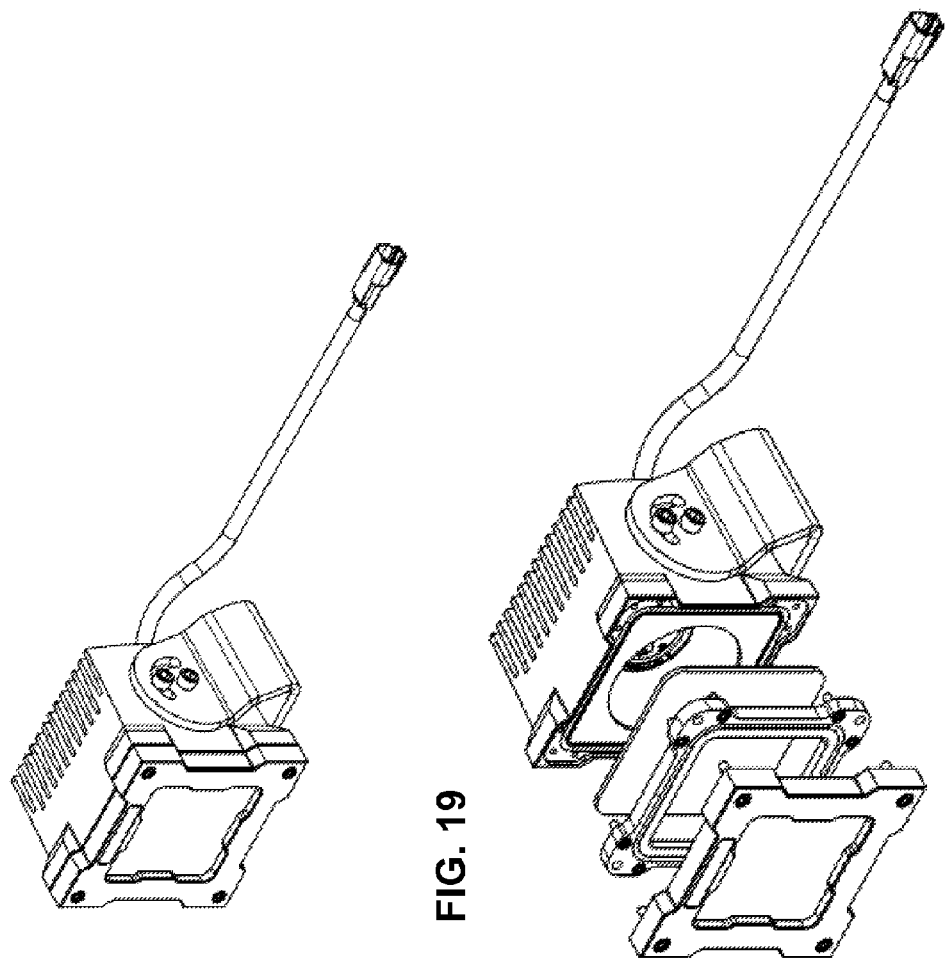
FIG. 18 is an isometric view of a rugged lighting system.
FIG. 19 is an isometric, exploded view of a rugged lighting system.
Figure 21:
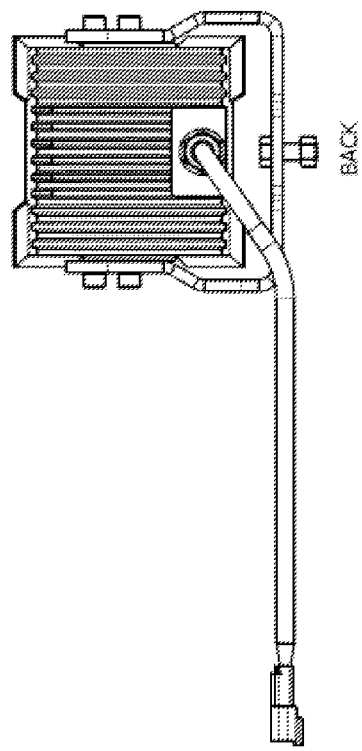
FIG. 21 is a back view of a rugged lighting system.
Figure 23:
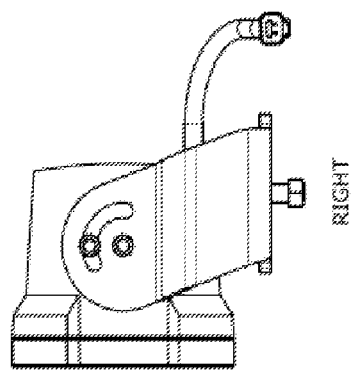
FIG. 23 is a right view of a rugged lighting system.
Figure 20:
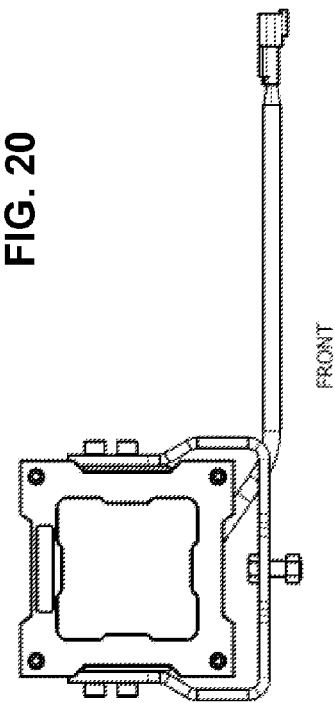
FIG. 20 is a front view of a rugged lighting system.
Figure 22:
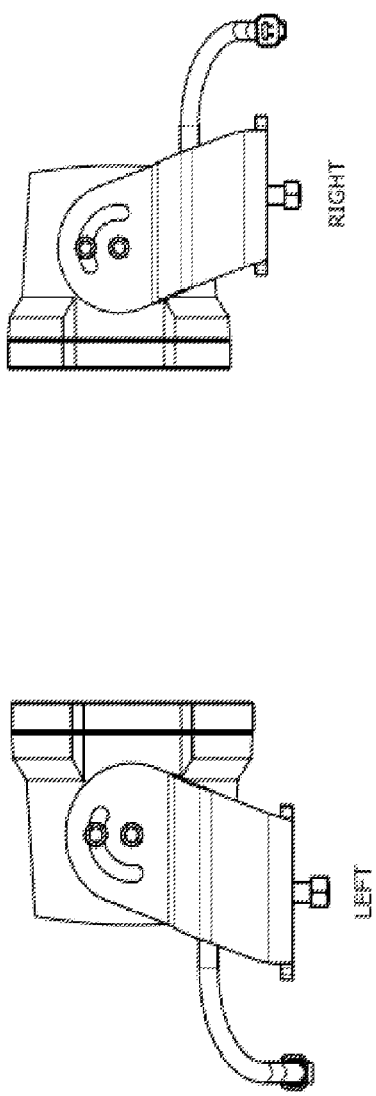
FIG. 22 is a left view of a rugged lighting system.
Figure 24:
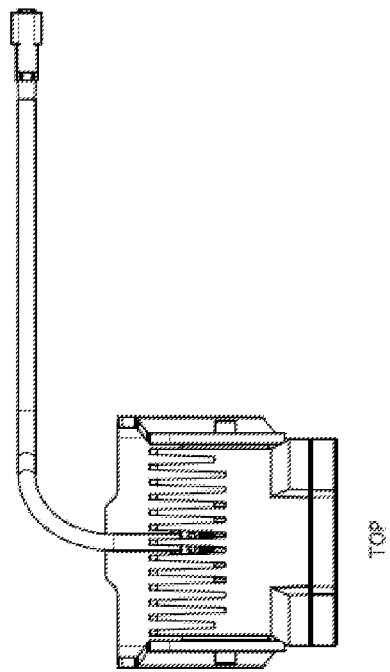
FIG. 24 is a top view of a rugged lighting system.
Figure 25:
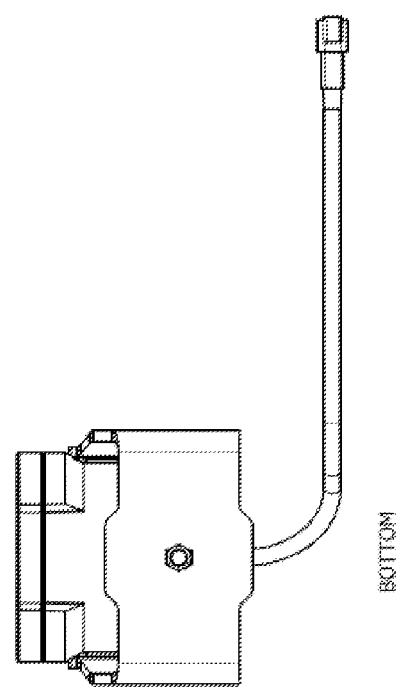
FIG. 25 is a bottom view of a rugged lighting system.

Referring now to FIG. 3, a side, cross-section of a rugged lighting system 100 is shown. The first lens 207 and first lens bezel 204 are shown attached to the housing unit 209. The second lens 202 and second lens bezel 201 are shown attached to the first lens 207, first lens bezel 204, and housing unit 209. Thus configured, the system provides two layers of protection, as well as optimal versatility and feature permutations from having two separate lenses. In various embodiments, both layers of protection are environmentally sealed and integrated to have the external appearance of a singular configuration.

Moreover, as noted from FIG. 3, the housing unit 209 is ruggedly constructed of relatively thick metal. The housing unit 209 may be integrally constructed.

In preferred embodiments, the LED array 214 is located within the housing unit 209 and configured to optimize brightness, while minimizing energy usage and thermal output. The system may, for example, incorporate Cree® CXA LED Arrays to achieve these ends. However, any number of LED arrays 214, or for that matter, light components that achieve these same purposes may be used without departing from the scope of the invention.

In various embodiments, the system may also incorporate electronics to operate the LED array 214. These electronics may be, for example, one or more circuit boards located within the housing 209 and connected to the LED array 214 and/or external power means 213. Operations may include, but are not limited to, detecting heat and powering down to prevent thermal damage to the system. Specifically, powering down does not include powering off; rather, the system is configured to scale down or optimize power usage for existing ambient temperatures in order to prevent thermal damage to the system.

Certain embodiments of the invention may also include a "piggy-back" bracket, onto which AC/DC power supply may be mounted in order to allow the system to alternatively run on AC power. The system may also include a "photo eye" or light sensor, capable of detecting daylight and/or nigh time conditions. Accordingly, the light is capable of automatically turning on or off according to preset sensitivity levels. This enables the system to achieve reduced energy consumption and adds longevity. In operation, a user can allow a user to selectively turn the light on, e.g., at fifteen (15) minutes prior to sundown, or five (5) minutes prior to sundown, etc.

Thus configured, embodiments of the present invention provide a rugged lighting system for use in a variety of applications. The problem of achieving a lighting system that optimizes ruggedness, luminosity, energy and thermal efficiency, versatility, and unbundling of key components is solved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A rugged lighting system comprising:
a housing unit with a body with integrally formed back, sides, and a front with an opening to provide access to the interior of the housing unit, the front also having a recessed keyhole portion;
a first lens configured to substantially cover the opening;
a first lens bezel shaped as a key to fit the recessed keyhole portion and configured to removeably attach to the housing unit over the first lens, the first lens bezel having one or more first apertures for directly receiving one or more bolts to removeably attach the first lens bezel and first lens to the housing unit, the first lens bezel having one or more second apertures for indirectly receiving one or more bolts for the purpose of removeably attaching the first lens, first lens bezel, a second lens, a second lens bezel to the housing unit;
a second lens configured for placement over the first lens;
a second lens bezel configured to removeably attach to the housing unit over the first lens bezel, the second lens bezel having one or more first apertures for directly receiving one or more bolts to removeably attach the second lens and second lens bezel to the housing unit;
wherein the first lens bezel is configured to nest between the second lens bezel and the housing unit, the first lens and first lens bezel configured to form a primary seal of the light and electronics modules, and the second lens and second lens bezel configured to form a secondary seal of the light and electronics modules; and
a light module within the housing unit comprising a light emitting diode (LED) mounted to an electronics module with a printed circuit board for operating the LED.

2. The rugged lighting system of claim 1, the light module operable to detect heat and power down to prevent thermal damage to the system.

3. The rugged lighting system of claim 1, further having an external power means with multiple power connections such that power may be alternately applied to connection points to achieve high power and low power modes of operation.

4. The rugged lighting system of claim 1, further comprising a photo eye capable of detecting daylight and night time conditions, the light module further capable of automatically turning off and on based upon settings of the photo eye.

5. The rugged lighting system of claim 1, the first lens bezel having one or more corners substantially wider than a corresponding side for providing additional protection to the housing unit.

6. The rugged lighting system of claim 1, the second lens bezel having one or more corners substantially wider than a corresponding side for providing additional protection to the housing unit.

7. The rugged lighting system of claim 1, the housing unit having one or more corners substantially wider than a corresponding side for providing additional protection to the housing unit.

* * * * *